United States Patent [19]

Chiu et al.

[11] 4,404,679
[45] Sep. 13, 1983

[54] DYE CELL HOLDER FOR DYE LASER

[75] Inventors: Pay H. Chiu; André J. Desroziers, both of London, Canada

[73] Assignee: Photochemical Research Associates Inc., London, Canada

[21] Appl. No.: 272,712

[22] Filed: Jun. 11, 1981

[51] Int. Cl.³ .............................................. H01S 3/20
[52] U.S. Cl. .................................... 372/54; 372/107; 372/108; 372/98; 372/53; 372/51
[58] Field of Search .................. 372/107, 108, 103, 98, 372/53, 51, 54; 356/240

Primary Examiner—James W. Davie
Assistant Examiner—Léon Scott, Jr.
Attorney, Agent, or Firm—Sim & McBurney

[57] ABSTRACT

A dye cell holder adapted for removable engagement with a support in a dye laser arrangement is disclosed. The holder is particularly adapted to hold thin fragile dye cells. The holder comprises means for supporting such fragile cell which contains a dye solution and is to be pumped by a laser beam. The dye cell is retained against the support by a retaining means which is movable relative to the support in a manner to provide access to permit insertion of the dye cell into the holder and to permit removal of the cell from the support means. Either the support means or the retaining means has an aperture through which a laser beam passes in pumping a dye solution in the dye c 11 Claims, 4 Drawing Figures

DYE CELL HOLDER FOR DYE LASER

FIELD OF THE INVENTION

This invention relates to holders for dye cells used in dye laser arrangements.

BACKGROUND OF THE INVENTION

Dye lasers are usually, either transversely pumped or longitudinally pumped to provide a dye laser output. Commonly the dye solution to be pumped by a pumping laser beam is contained in a cell. Depending upon the characteristics of the pumping beam in terms of its energy and duration and the desired output, the dye cell may take on various configurations. In situations where high energy and high repetition rates are used in pumping a dye laser cell, circulation of dye through the cell is required and in some situations instead of pumping a dye solution in a cell, as circulated therethrough, the dye may be exposed to the radiation as passed therethrough in the form of a stream, in the manner disclosed in U.S. Pat. No. 3,873,941. Alternatively, the dye to be pumped may be contained in a cell as disclosed in U.S. Pat. No. 3,766,488.

Advances have been made in ultrashort cavities for dye lasers as disclosed in H. Salzmann and H. Strohwald, Physics Letter 57a (1976) 41 report. The dye cell has a mirrored rear surface and a prism for the front face with spacers separating the mirror from the prism to define a very narrow cavity. Such dye cells usually require disassembly when it is desired to change the dye solution. In view of their size, this can be extremely difficult to accomplish.

The dye cell holder, according to this invention, substantially facilitates the use of sealed thin fragile dye cells which are now commonly used to obtain shortened laser beam outputs in a manner, as discussed in my copening U.S. patent application Ser. No. 272,772, filed June 11, 1981.

SUMMARY OF THE INVENTION

The dye cell holder, according to this invention, is adapted for removable engagement with a support therefor in a dye laser arrangement. The holder comprises means for supporting a thin fragile dye cell containing a dye solution to be pumped by a laser beam and means overlying the support means and a supported thin dye cell for retaining such supported dye cell against the support. The retaining means is movable relative to the support means in a manner to provide access to permit insertion of a thin dye cell into the holder and to permit removal of a thin dye cell from the support means. Either the support means or the retaining means has an aperture through which a laser beam passes in pumping a dye solution in such held dye cell.

The dye cell holder may cooperate with the support of the dye laser arrangement in a manner to increase the retention force by the retaining means of the dye cell when engaged with the support.

The dye cell holder may be wedge-shaped so as to be received by a cooperating wedge-shaped receiving area in the support of a dye laser arrangement. On placing the holder in the wedge-shaped receiving area, this moves the support means and retaining means together to squeeze lightly and thereby hold a dye cell in the holder. The receptacle is provided with an aperture aligned with the aperture in the dye cell holder.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
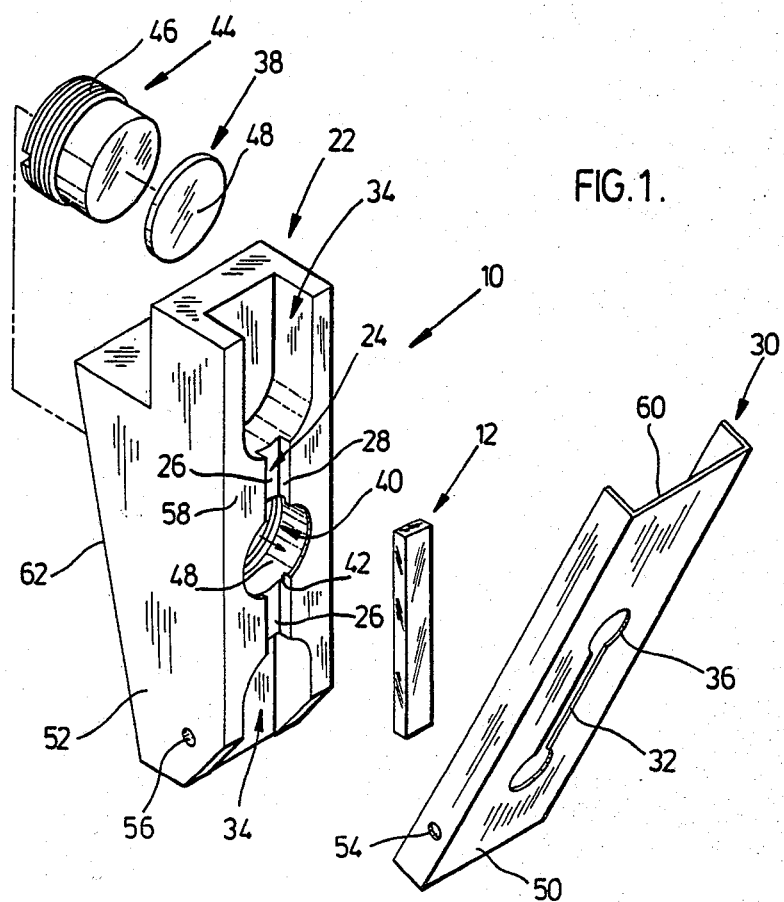
FIG. 1 is an exploded view of a dye cell holder, according to this invention.

In the use of a dye laser, it is desirable to be able to vary the parameters of the dye cell in terms of the dye compositions contained in the cell, the dye concentration and the thickness of the cell, to name only a few of the considerations. To this end, several discrete individual sealed dye cells may be made containing various dyes and various concentrations of such dyes and may be of varying thicknesses. Thus a bank of dye cells may be provided so that an operator may choose one of the many cells to provide a desirable output knowing the characteristics of the pumping beam and how that dye at the particular concentration and cell depth reacts to such pumping beam. The holder 10, as shown in FIG. 1, is adapted to permit easy replacement of dye cells in the holder so that one can readily change the dye composition or concentration to vary the output of a dye laser. A thin fragile cell, generally designated 12, is to be inserted in the dye cell holder 10. The dye cell 12 is sealed and contains a particular dye composition of a known concentration. Such individual dye cells may be placed in an appropriate rack so that they may be withdrawn as desired for insertion in the dye cell holder. Such dye cells may be of the type as shown, namely rectangular in cross-section and relatively thin and fragile. Such cells may be made, for example, from glass or quartz. The ends of the tube of the dye cell are sealed to provide and enclosed cell for the dye composition. Such ready replacable aspects for the cells also permits changing of the cell, should the dye deteriorate due to extended periods of exposure to pumping beams of higher energy and/or high repetition rates. Alternative configurations for the dye cells may be used and the holder modified accordingly to hold such cells. For example, the cell may be disc shaped or an elongate cylindrical shape.

Figure 2:
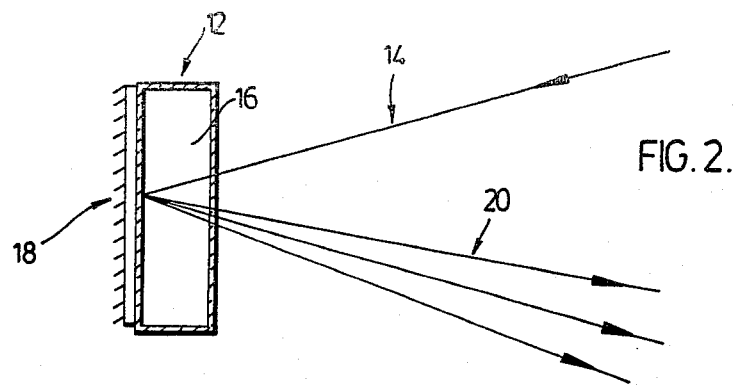
FIG. 2 is a section through a dye cell and associated reflective surface to demonstrate longitudinal pumping thereof.

As shown in FIG. 2, the dye cell 12 is longitudinally pumped by an incoming laser beam 14 which is directed onto the interior of the cell 16 containing the dye solution. Provided at the rear of the dye cell 12 is a reflective device 18 which may be in the form of a mirror adapted to reflect lasing radiation generated within the dye cell outwardly of the dye cell in the direction of arrows 20.

In order to hold the dye cell such that it may be pumped by an incoming beam 14, the holder 10 comprises a support or base portion generally designated 22. The support 22 has a recess at 24 with base portion 26 and opposing sidewalls 28 to approximate the width and depth of the rectangular in cross-section dye cell 12. Such recess 24 receives the dye cell 12 to locate it relative to an aperture 32 in retaining device 30 which holds and retains the dye cell 12 against the support 22. The retaining device window provides an aperture through which an incoming pumping beam 14 may enter and pump the dye solution within the dye cell 12.

The dye cell 12 may have enlarged ends, as a result of being sealed at one end by a chemical sealant and at the other end by heat. Such ends are received in the enlarged recess areas 34 of the support. Opposing ends of the aperture 32 are enlarged at 36 to also accommodate the enlarged ends of the dye cell 12. In addition, the enlarged areas 34 in the support provide for finger access in lifting the fragile cell from the recessed area 24.

Inserted from the rear of the support 22 is a reflective surface 38 in the form of a circular mirror. The mirror is inserted through bore generally designated 40 in the support and its peripheral face aligns with interior ledge 42, as provided at the inner extremity of the bore 40. In order to retain the mirror 38 against such face, a plug 44, having threaded portion 46, is threaded into the bore 40 in the direction of arror 48. As can be seen, the ledge 42 extends slightly into the base 26 of the receiving area 24 of the support. The mirror slightly projects above the base 26 of the recess 24 so that the rear face of the rectangular-shaped dye cell rests against the planar face 48 of the mirror 38.

The retaining device 30 is in the form of a U-shaped plate. The plate is pivotally connected at its lower end 50 to the lower end 52 of the support 22. Pins, not shown, extended through apertures 54 of the retaining plate 30 and apertures 56 of the support to complete such pivotal connection. About the recessed area 24 of the support is a planar face portion 58. Interior of the plate 30 is a planar face portion 60. The location of the pivotal connection is such that when the retaining plate 30 is hinged or pivoted towards the support face 58, the dye cell rear face is pushed against the base of the recess 24 or in the instance where the mirror 48 projects into the recess, the rear face of the cell is pushed lightly against the planar face 48 of the mirror to thereby lightly squeeze the cell and retain the cell in the holder.

The support 22 is tapered, that is its rear face 62 slopes towards its front face 58 to provide a wedge-shaped block portion. The lower end 50 of the retaining plate 30 is, therefore, pivotally connected at the narrower portion 52 of the support 22 to provide in combination a tapered unit. Such taper to the holder, when placed in an appropriate wedge-shaped receptacle, biases the retaining plate 30 against the support 22 to provide a light retaining force or pressure on the cell 12 against the mirror or against the base 26 of the recess 24 to squeeze and thereby hold the cell in the holder. Thus the retention of this cell in the holder is enhanced by positioning the holder in a support used in a dye laser arrangement.

Figure 3:
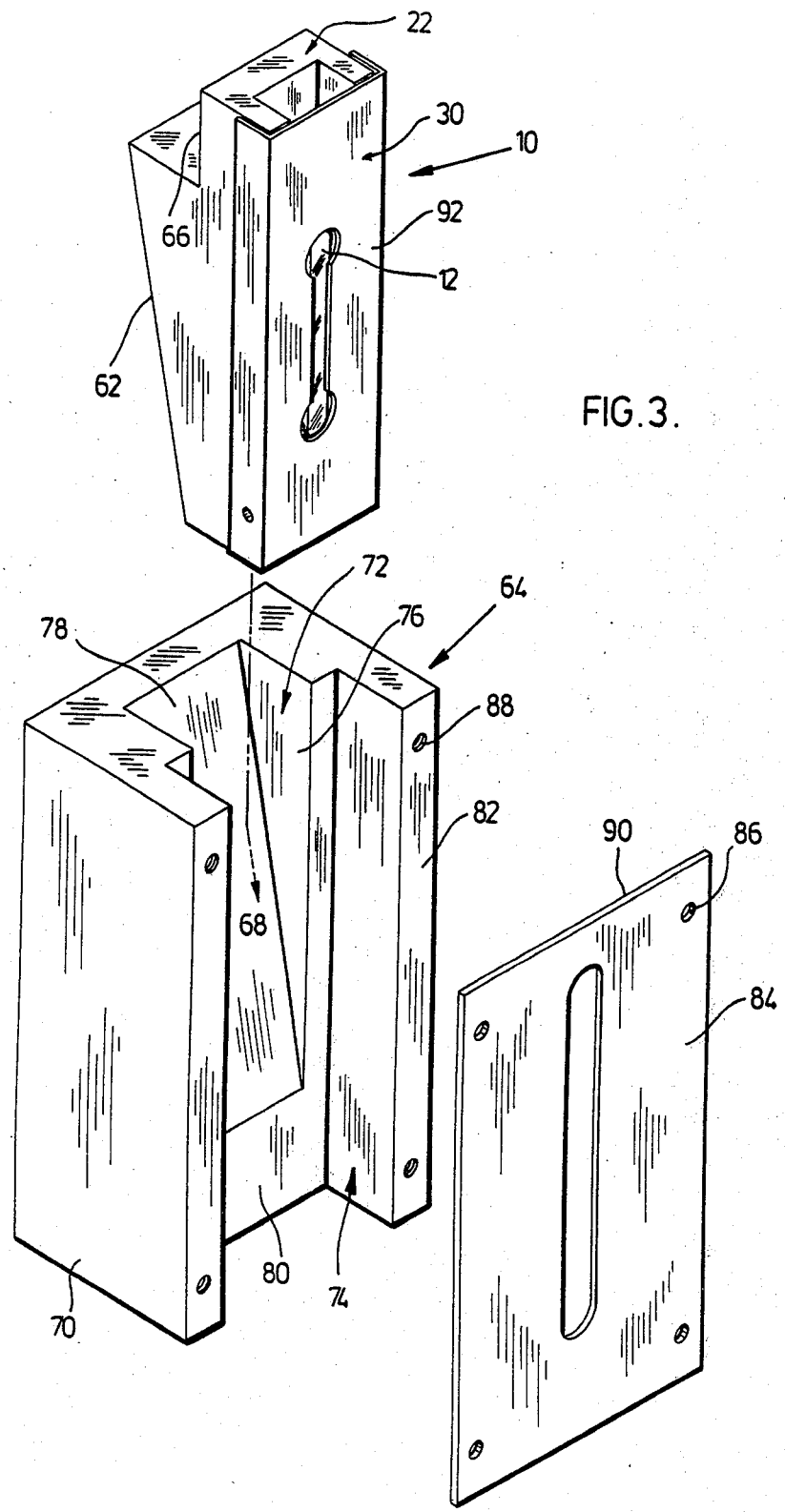
FIG. 3 is an exploded view of a support for the assembled dye cell holder of FIG. 1.

Referring to FIG. 3, such a support 64 is shown. The support 64 may have its position fixed relative to an incoming pumping laser beam 14 so as to provide the appropriate angle for the reflective surface 18 and thus give the desired direction of output, as shown in FIG. 2. This fixing of the support 64 relative to the incoming pumping beam obviates the need to realign a dye cell in the holder relative the incoming beam when a cell is replaced. It is appreciated that the support 64 may be mounted on a standard or base which is calibrated and can be adjusted in a controlled predetermined manner relative to the incoming beam to vary the angle at which the beam pumps the dye relative to the front face of the cell.

The holder 10, as shown in FIG. 3, is assembled and retains a cell 12 therein by way of the retaining plate 30 being held against the support 22. The plate 30 may be held against the support 22 by the operator's fingers where the rear face 66 of the support 22 provides a finger grip in holding the unit together for insertion in a direction of arrow 68 into the support 64. The support 64 has a base portion 70 with a wedge-shaped receptacle portion 72 provided therein beneath the channel-shaped portion 74. The wedge-shaped recess 72 has opposing triangular-shaped sidewalls 76 with a base portion 78 inclined upwardly towards the base 80 of the channel-shaped areas 74. Secured to the face portion 82 of the support base 70 is a plate 84 which is secured to the face portion 82 by way of screws, not shown, extending through apertures 86 in the plate and into apertures 88 of the support base. The shape of the receptacle thus defined between the rear face 90 of the plate 84 and the base 78 of the receptacle is such to provide a sliding mating fit with the wedge-shape of the holder 10. Thus, inserting the holder 10 in the direction of arrow 68, locates the face portion 92 of the retaining plate 30 against the rear face 90 of plate 84 and the tapered rear face 62 of the support 22 mates with the face 78 of the receptacle so that as the holder is lowered, the tapered wedging effect causes a slight squeezing action on the cell. While inserting the holder in the support 64, the finger gripping of the plate 30 and ledge 66 of the holder ensures that the cell is held in position during lowering of the holder into the tapered receptacle 72 of the support 64.

Figure 4:
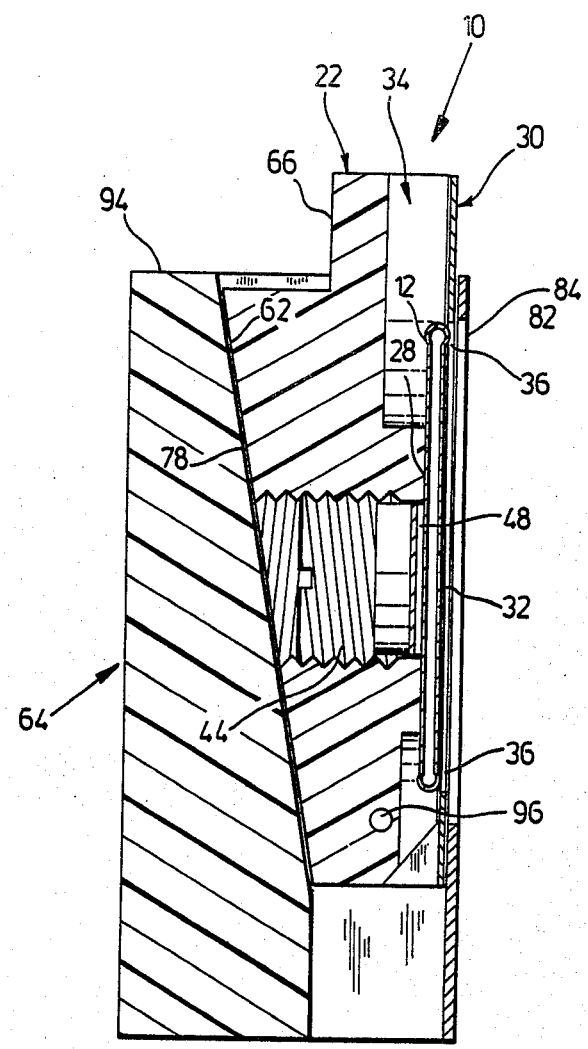
FIG. 4 is a section through a support with dye cell holder located therein.

As shown in FIG. 4, the finger gripping area between shoulder 66 and the face of the retaining plate 30 projects above the upper surface 94 of the support 64 to facilitate removal of the holder from its support. The pivotal location at 96 at the lower end of the holder 10 is dimensionally such that with the retaining plate 30 against the plate 84 of the support 64, the plate 30 lightly squeezes the cell 12 against the face 48 of the circular mirror. As mentioned, the mirror 38 may have its front face 48 projecting slightly above the recess base 26, such that the slight pressure against the cell 12 pushes the rear face of the cell against the face 48 of the mirror to minimize or eliminate air gaps between the mirror and cell.

In the embodiment shown in FIG. 4, the face of the mirror 48 is coplanar with the base portion 26 of the recess, so that the cell rear face is pressed lightly against the mirror face and also the base 26 of the recess to distribute such pressure over its length. The enlarged end portions of the cell 12 are received in the enlarged recess areas 34 and also in openings 36 of the plate. The width of the opening 32 in the retaining plate 30 is less than the width of the dye cell to ensure that pressure is applied along the planar surfaces of the cell's length to retain it against the reflective surface 48 as the device is used in a longitudinally pumped dye laser arrangement. The wedging action of the holder 10 with its rear face 62 against the face 78 of the receptacle is shown in FIG. 4 to enhance the squeezing action of the retaining plate 30 against the support 22 of the holder.

With the removable aspect for the mirror 38, it is appreciated that the mirrors may be replaced should they become scratched or damaged for one reason or another. In providing such replacement feature, the screw threaded relationship of the plug portion 44 may be used to provide for insertion of the mirror after the dye cell 12 is in position in the recess 24 of the support.

This step may be used to eliminate or reduce the changes of scratching the mirror while the dye cell is being inserted in the holder and retained therein by the retaining plate 30.

It is appreciated, however, that the rear face of the dye cell 12 may have a reflective coating provided thereon, thereby eliminating the need for the removable mirror in the recess 24.

It is also appreciated that, although the retaining plate 30 is shown in this embodiment as having the aperture provided therein, in a situation where a mirror is not required, the support 22 of the holder 10 may be provided with the aperture for the incoming pumping beam of the laser arrangement. In such situations, some other form of support may be used for supporting the holder in the dye laser arrangement such as supporting the holder at its ends.

With the holder arrangement, according to the invention, it is appreciated that several forms of dye cells may be made in advance and contained in a rack and the cells simply changed as required by deterioration of the dye in the cell or a desire to change the cell to provide a new dye or concentration of dye to alter the output of the dye laser. This provides substantial convenience in operating of the dye laser.

Although various preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. In combination, a dye cell holder and a receptable therefor for use in a dye laser arrangement, said dye cell holder comprising means for supporting a thin fragile dye cell and means for retaining such dye cell against said supporting means, said retaining means having an aperture provided therein to permit an incoming laser beam to pump a dye solution in such dye cell, said support means and retaining means forming a wedge-shaped unit whereby said support means has a front face to support such dye cell and a rear face, said support front and rear faces converging to provide in conjunction with said retaining means the wedge-shaped unit having a narrower lower portion, said retaining means and support means being pivotally connected together about an axis at the narrower portion of said support means with said axis extending in a direction essentially parallel to the front face of said support means, said receptacle having a cooperating wedge-shaped receiving area with opposing surfaces for engaging the support rear face and the retaining means when said unit is placed in said receptacle for moving said support means and retaining means together to squeeze lightly and thereby hold such dye cell in said holder, said receptacle being provided with an aperture aligned with said aperture in said retaining means.

2. In the combination of claim 1, wherein said retaining means is elongated and is pivotally connected at one end to an end of said support with said aperture in said retaining means aligned with said recessed portion of said support, said retaining means as hinged about its pivot point being capable of squeezing a dye cell against said reflecting means, said retaining means being swung away from said support means to provide said access for dye cell insertion or removal.

3. In the combination of claim 1, said support means front face being elongated and of a length to support and protect an elongate thin fragile dye cell of rectangular cross-section.

4. In the combination of claim 1, said support means front face having a recess to receive and to locate a dye cell placed on said support means behind said aperture of said retaining means.

5. In the combination of claim 4, said support means front face having a planar face along said recess, said retaining means being a thin plate having said aperture aligned with said recess, said recess being of a depth slightly less than the thickness of a rectangular in cross-section elongate dye cell, said retaining means squeezing such dye cell against the bottom of said recess when said holder is placed in said receptacle.

6. In the combination of claim 5, a means for reflecting lasing radiation from such dye cell being provided in the bottom of said recess, said reflecting means projecting along said recess bottom and having a planar face, said planar face of said reflecting means and said retaining means being moved toward one another to hold such dye cell in said holder.

7. In the combination of claim 6, said retaining means having an interior planar surface about said aperture, the planar face of a rectangular in cross-section dye cell contacting said planar face of said reflecting means as forced thereagainst by said retaining means when said holder is placed into said receptacle to minimize air gaps between such dye cell and said reflecting means.

8. In the cmbination of claim 7, said reflecting means being removably mounted in said support means.

9. In the combination of claim 6, 7 or 8, said reflecting means being a mirror with its reflective surface protected by means for setting said mirror in said support means.

10. In the combination of claim 4, said support having depressions at each end of said recess to accommodate enlarged portions of sealed ends of a dye cell.

11. In the combination of claim 1, 3 or 5, said holder being adapted to hold a thin fragile rectangular in cross-section dye cell having a cavity depth of approximately 0.2 mm to .1 mm and front and rear wall thickness of approxmately 0.2 mm.

* * * * *